United States Patent [19]
Ohkubo

[11] Patent Number: 5,189,942
[45] Date of Patent: Mar. 2, 1993

[54] 3-POSITION ACTUATOR

[75] Inventor: Masahiro Ohkubo, Osaka, Japan

[73] Assignee: Kabushiki Kaisha Daikin Seisakusho, Osaka, Japan

[21] Appl. No.: 721,655

[22] PCT Filed: Nov. 8, 1990

[86] PCT No.: PCT/JP90/01453

§ 371 Date: Aug. 21, 1991

§ 102(e) Date: Aug. 21, 1991

[87] PCT Pub. No.: WO91/09069

PCT Pub. Date: Jun. 27, 1991

[30] Foreign Application Priority Data

Dec. 22, 1989 [JP] Japan .................................. 1-334087

[51] Int. Cl.⁵ .............................................. F01B 31/14
[52] U.S. Cl. ........................................ 92/13.6; 92/13; 92/131; 92/135; 74/335
[58] Field of Search .................. 92/13, 13.8, 131, 135, 92/130 R, 13.51, 13.6; 74/335

[56] References Cited

U.S. PATENT DOCUMENTS

| | | | |
|---|---|---|---|
| 3,143,042 | 8/1964 | Borgeson et al. | 92/131 |
| 3,168,854 | 2/1965 | Neilson | 92/131 |
| 3,991,661 | 11/1976 | Mocha | 92/131 |
| 4,033,233 | 7/1977 | Toi | 92/131 |
| 4,585,024 | 4/1986 | Esseniyi | 92/131 |
| 4,669,567 | 6/1987 | Nakamura et al. | 92/131 |
| 5,012,725 | 5/1991 | Leary | 74/335 |

FOREIGN PATENT DOCUMENTS

| | | |
|---|---|---|
| 2261705 | 6/1974 | Fed. Rep. of Germany ....... 92/13.6 |
| 2808541 | 9/1979 | Fed. Rep. of Germany ........ 92/131 |
| 55-40763 | 10/1980 | Japan . |
| 61-481 | 1/1986 | Japan . |
| 63-139304 | 9/1988 | Japan . |

Primary Examiner—Thomas E. Denion
Attorney, Agent, or Firm—Armstrong, Westerman, Hattori, McLeland & Naughton

[57] ABSTRACT

A 3-position actuator having a moving body comprising a piston and piston rod slidingly reciprocating in an axial direction within a casing, a part of the rod protruding from said casing, said moving body being moved to one end side when fluid flows into a first fluid chamber through a first port formed on said casing, and said moving body being moved to the other end side when fluid flows into a second fluid chamber through a second port formed on said casing; characterized by that a pair of stoppers are installed in said casing with a specified clearance left between them in the axial direction, a pair of spring seats and a spring are installed between the pair of stoppers, said spring is located between the pair of spring seats to press one spring seat against one stopper and to press the other spring seat against the other stopper, a pair of stopping portions are provided on said moving body in a projecting manner with a specified clearance left between them in the axial direction, one stopping portion mates with said one spring seat from a side opposite to the spring under a state where said one spring seat contacts with said one stopper, and the other stopping portion mates with said other spring seat from the side opposite to the spring under a state where said other spring seat contacts with said other stopper.

3 Claims, 5 Drawing Sheets

3-POSITION ACTUATOR

TECHNICAL FIELD

This invention relates to a 3-position actuator which moves linearly by means of fluid.

BACKGROUND ART

In a 3-position actuator which moves linearly by means of fluid, it is difficult to precisely locate a neutral position by a simple mechanism so that a cylinder with double structure has hitherto been used.

In the structure employing the above cylinder with double structure, its construction has been complicated size and heavy in weight.

DISCLOSURE OF THE INVENTION

In order to solve the above problem, this invention provides a 3-position actuator having a moving body comprising a piston slidingly reciprocating for a specified distance in an axial direction within a casing, and a piston rod which moves integrally with the piston and a part of which protrudes out of said casing, said moving body being moved to one end side when fluid flows into a first fluid chamber through a first port formed on said casing, and said moving body being moved to the other end side when fluid flows into a second fluid chamber through a second port formed on said casing; characterized by that a pair of stoppers are installed in said casing with a specified clearance left between them in the axial direction, a pair of spring seats and a spring are installed between the pair of stoppers, said spring is located between the pair of spring seats to press one-side spring seat against said one-side stopper and to press the other-side spring seat against said other-side stopper, a pair of stopping portions are provided on said moving body in a projecting manner with a specified clearance left between them in the axial direction, said one-side stopping portion mates with said one-side spring seat from a side opposite to the spring under a state where said one-side spring seat contacts with said one-side stopper, and said other-side stopping portion mates with said other-side spring seat from the side opposite to the spring under a state where said other-side spring seat contacts with said other-side stopper.

In this invention, the spring presses the one-side spring seat against the one-side stopper and the other-side spring seat against the other-side stopper, under a neutral state. The one-side stopping portion mates with the one-side spring seat from a side opposite to the spring under the state where the one-side spring seat contacts with the one-side stopper. The otherside stopping portion mates with the other-side spring seat from the side opposite to the spring under the state where the other-side spring seat contacts with the otherside stopper.

BEST MODE FOR CARRYING OUT THE INVENTION

Figure 2:
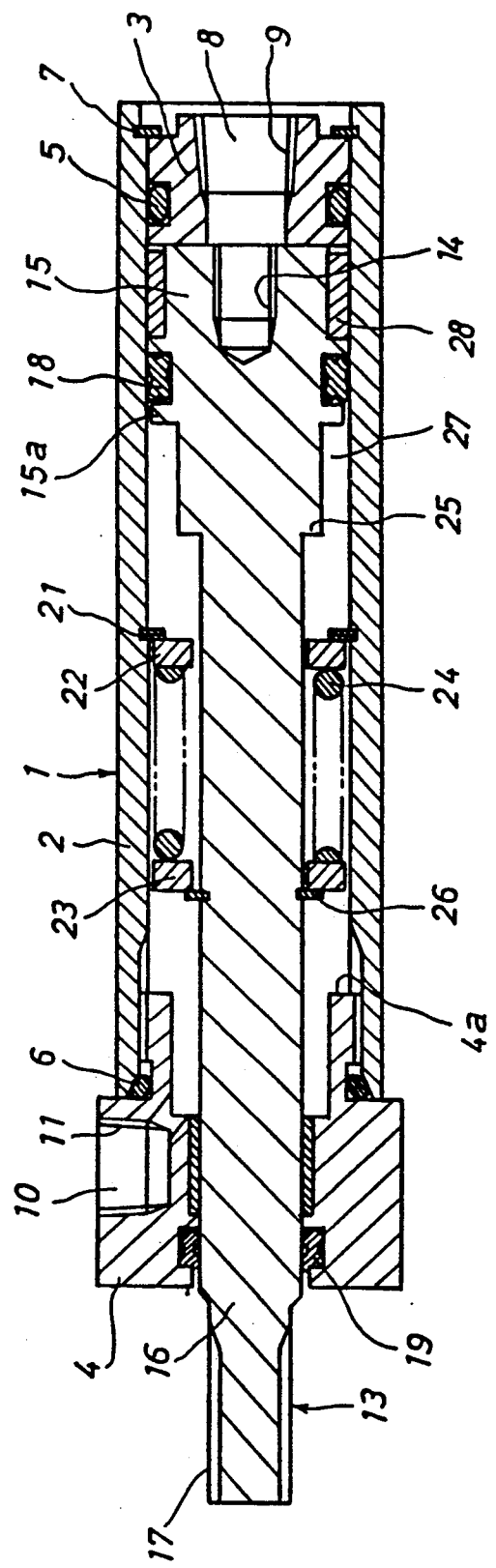
FIG. 2 and FIG. 3 are sectional views for explaining a function of the 3-position actuator.
Figure 3:
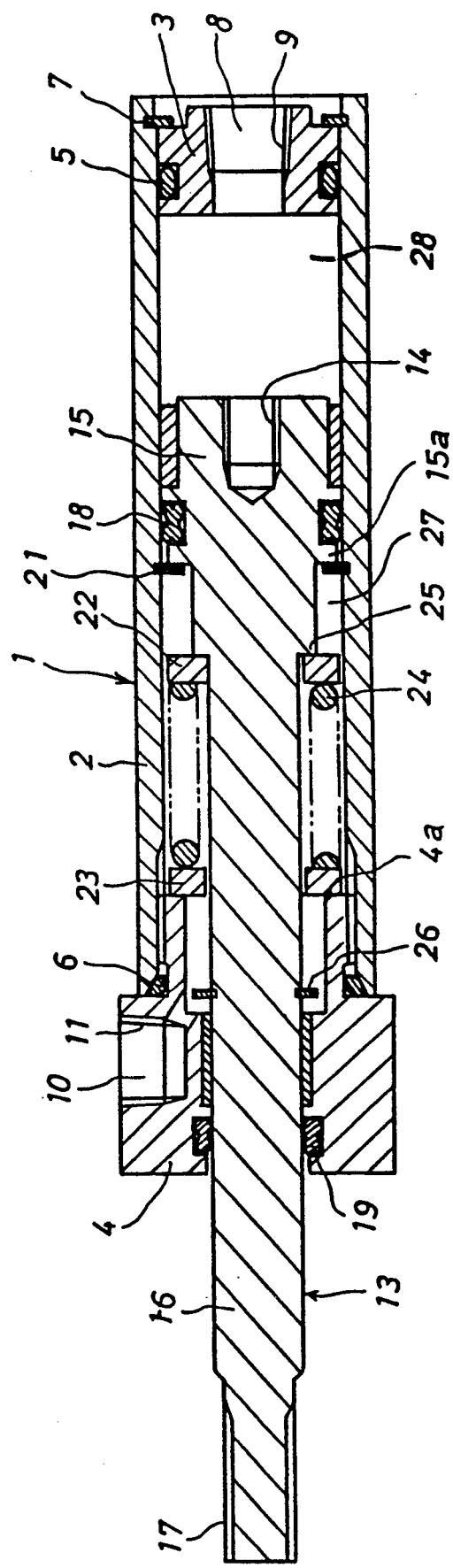

An embodiment of this invention will be described hereunder with reference to FIG. 1 through FIG. 3.

Figure 1:
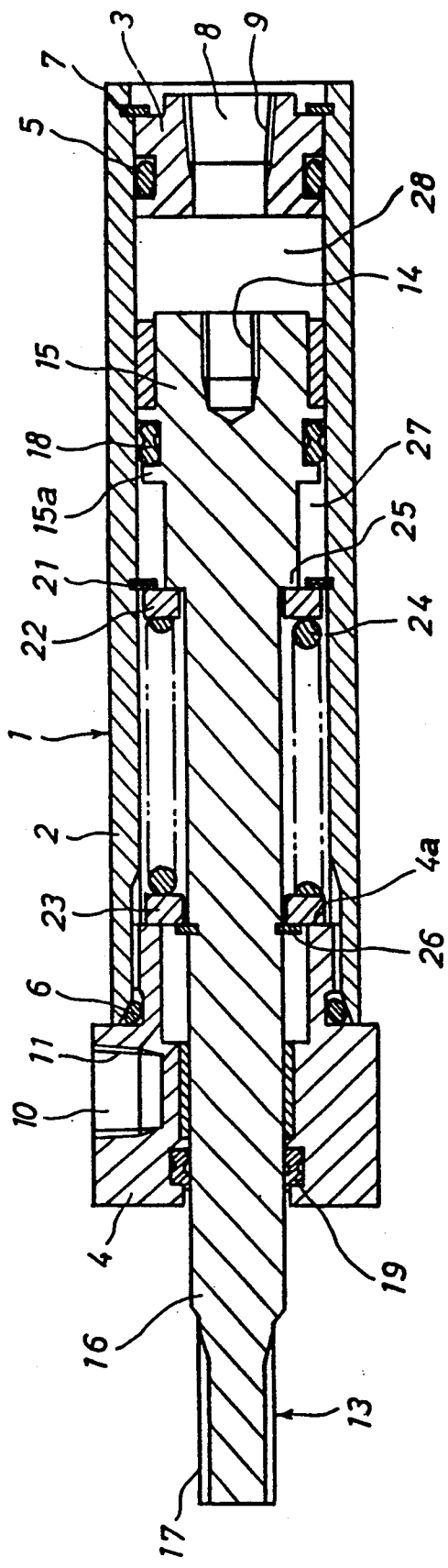
FIG. 1 is a sectional view of a 3-position actuator in an embodiment of this invention.

FIG. 1 is the sectional view of the 3-position actuator in the embodiment of this invention and shows a neutral state. A casing 1 is composed of a cylindrical casing body 2, a blocking member 3 inserted in one end of the casing body 2, and a blocking member 4 screwed in the other end of the casing body 2. A seal ring 5 contacting with an inner periphery of the casing body 2 is fitted onto an outer periphery of the blocking member 3, and a seal ring 6 contacting with an inner periphery of the casing body 2 is fitted onto an outer periphery of the blocking member 4. A snap ring 7 for inhibiting the blocking member 3 from slipping off is fitted in an inner periphery of the one end of the casing body 2. A through hole 8 is formed on the blocking member 3 at its central part in the axial direction, and female threads 9 are formed on a peripheral wall of the through hole 8. A through hole 10 bent approximately into an L-shape is formed on the blocking member 4, and female threads 11 are formed on a peripheral wall of the through hole 10. A moving body 13 housed in the casing 1 is composed of a piston 15 which fits in an inner periphery of the casing body 2 in a sliding manner and on one end of which female threads 14 are formed, and a piston rod 16 which protrudes integrally from the other end of the piston 15 in the axial direction. The other end of the piston rod 16 protrudes to an outside of the casing 1 piercing through the blocking member 4, and male threads 17 are formed on an outer periphery of the other end of the piston rod 16. An annular packing 18 contacting with the inner periphery of the casing body 2 is fitted onto an outer periphery of the piston 15, and an annular packing 19 contacting with an outer periphery of the piston rod 16 is fitted in an inner periphery of the blocking member 4. A snap ring 21 is fitted in the inner periphery of the casing body 2 at its approximately central portion of axial length, and annular spring seats 22 & 23 and a coil spring 24 forming an example of the spring are installed between the snap ring 21 and one end 4a of the blocking member 4. The spring seats 22 & 23 are movable in the axial direction, and the coil spring 24 presses the spring seat 22 against the snap ring 21 and at the same time presses the spring seat 23 against the one end 4a of the blocking member 4. A stepped portion 25 formed at a boundary between the piston 15 of the moving body 13 and the piston rod 16 of the same mates with the spring seat 22 from a side opposite to the coil spring 24 under a state where the spring seat 22 is pressed on the snap ring 21 as pressed also on the stepped portion 25 by the coil spring 4. A snap ring 26 is fitted onto an outer periphery of the piston rod 16 at its approximately central part of axial length, and the snap ring 26 mates with the spring seat 23 from a side opposite to the coil spring 24 under a state where the spring seat 23 is pressed on the one end 4a of the blocking member 4 as illustrated by FIG. 1. Namely, the spring seat 23 is pressed also on the snap ring 26 by the coil spring 24. Concerning an inside of the casing 1, a first fluid chamber 27 is formed between the piston 15 and the blocking member 4, a second fluid chamber 28 is formed between the piston 15 and the blocking member 3, the first fluid chamber 27 is connected to the through hole 10, and the second fluid chamber 28 is connected to the through hole 8. The through hole 10 composes a first port for allowing working fluid such as compressed air or pressurized oil to flow into the first fluid chamber 27, and the through hole 8 composes a second port for allowing the fluid to flow into the second fluid chamber 28. The snap ring 21 composes a stopper for limiting a movement of the spring seat 22 to one end side, and the one end 4a of the blocking member 4 composes a stopper for limiting a movement of the spring seat 23 to the other end side. The stepped portion 25 composes a stopping portion for allowing the spring seat 22 to move to the other side end only, and the snap ring 26 composes a stopping portion for allowing the spring seat 23 to move to one end side only.

Function will be described hereunder. Under the state of FIG. 1; fluid of a specified pressure is not supplied to the first fluid chamber 27 and the second fluid chamber 28, the spring seat 22 is pressed on the snap ring 21 by the coil spring 24, and the spring seat 23 is pressed on the one end 4a of the blocking member 4 by the coil spring 24. Consequently, the stepped portion 25 mates with the spring seat 22, the snap ring 26 mates with the spring seat 23, so that the moving body 13 is located at a neutral position.

When fluid of a specified pressure is supplied through the through hole 10 to the first fluid chamber 27, the piston 15 is pushed to one end side (right side in the figure) so that the moving body 13 is moved to the one end side against a pressing force of the coil spring 24. Namely, the moving body 13 moves under a state where the snap ring 26 mates with the spring seat 23, and the coil spring 24 is thereby compressed. The moving body 13 is stopped through means of contact of its one end with the blocking member 3 as shown by FIG. 2. When fluid in the first fluid chamber 27 is drained, the moving body 13 is returned to the neutral position by the pressing force of the coil spring 24.

When fluid of a specified pressure is supplied through the through hole 8 to the second fluid chamber 28, the piston 15 is pushed to the other end side (left side in the figure) so that the moving body 13 is moved to the other end side against the pressing force of the coil spring 24. Namely, the moving body 13 moves under a state where the stepped portion 25 mates with the spring seat 22, and the coil spring 24 is thereby compressed. The moving body 13 is stopped through means of contact of the projection 15a of the piston 15 with the snap ring 21 as shown by FIG. 3. When fluid in the second fluid chamber 28 is drained, the moving body 13 is returned to the neutral position by the pressing force of the coil spring 24.

As described above, the spring seat 22 is pressed on the snap ring 21 and at the same time the spring seat 23 is pressed on the one end 4a of the blocking member 4 by the coil spring 24, and the spring seat 22 is made mate with the stepped portion 25 and at the same time the spring seat 23 is made mate with the snap ring 26, so that the moving body 13 is located at the neutral position. Therefore, even the actuator having a structure as simple as the conventional 2-position actuator can locate the moving body 13 precisely at the neutral position, and can accomplish the reduction in manufacturing cost and the decrease in size and weight simultaneously.

Figure 4:
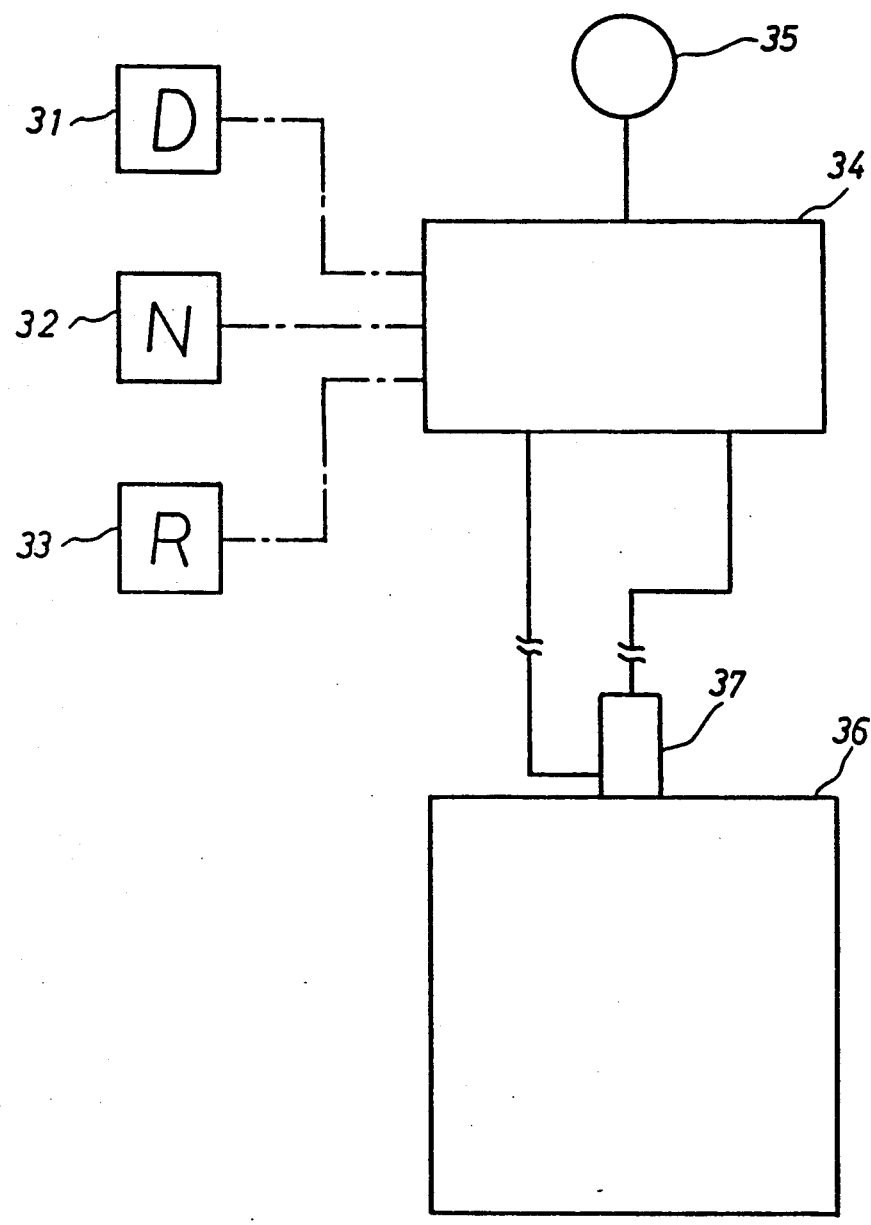
FIG. 4 is an explanatory view of example of use of the 3-position actuator.

FIG. 4 is the explanatory view of example of use of the above-mentioned 3-position actuator. In a vehicle such as a bus wherein a shift tower and an automatic transmission can not be connected directly mechanically, a change-over valve 34 is changed by operating push buttons 31, 32 & 33 to properly select a passage of compressed air which is supplied from an accumulator 35 to an actuator 37 of an automatic transmission 36, and an operation mode can thus be selected. By adopting the above-mentioned 3-position actuator as the actuator 37, for example when the push button for forward drive 31 is pushed, the change-over valve 34 is changed to supply compressed air in the accumulator 35 to the first fluid chamber 27 and the moving body 13 is moved to a stroke limit at one end side, so that the automatic transmission 36 is brought into a state of forward drive mode. When the push button for backward drive 33 is pushed, the change-over valve 34 is changed to supply compressed air in the accumulator 35 to the second fluid chamber 28 and the moving body 13 is moved to a stroke limit at the other end side, so that the automatic transmission 36 is brought into a state of backward drive mode. When the push button for neutral position 32 is pushed, the change-over valve is changed not to supply compressed air in the accumulator 35 neither to the first fluid chamber 27 nor to the second fluid chamber 28 and the moving body 13 is located at the neutral position, so that the automatic transmission 36 is brought into a state of neutral mode. As described above, the adoption of the above-mentioned 3-position actuator as the actuator 37 is preferable from a point of view of safety measure, because the moving body 13 is located precisely at the neutral position to bring the automatic transmission 36 to the neutral mode even when compressed air becomes not supplied from the accumulator 35, for example, under an engine stopped state. Push buttons for first and second speeds are omitted in FIG. 4, however, when these buttons are pushed the change-over valve 34 is changed in the same way as the case where the push button for forward drive 31 is pushed.

Figure 5:
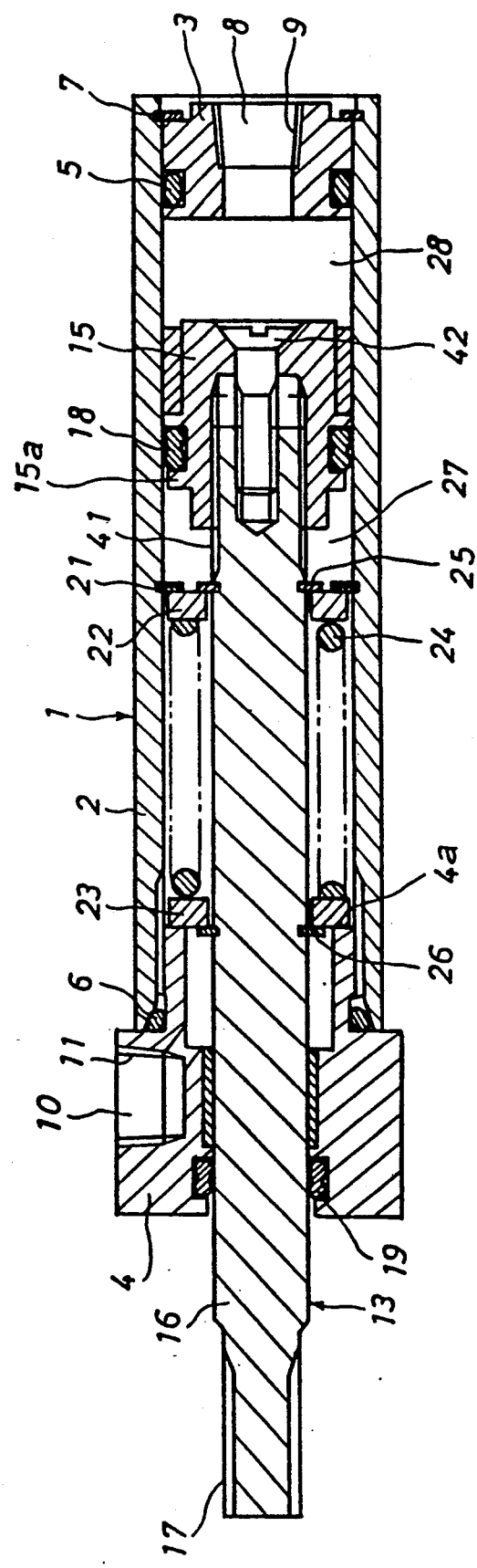
FIG. 5 is a sectional view of a 3-position actuator of another embodiment.

FIG. 5 shows another embodiment. The structure may be formed as illustrated by this figure wherein male threads 41 are formed on an outer periphery at one end of the piston rod 16 and screwed into the piston 15 so that the piston 15 may be fastened by a screw 42. A stroke distance of the moving body 13 to one end side can be adjusted voluntarily by so forming the structure. In this embodiment, the piston rod 16 composes the moving body proper and the piston 15 composes an adjusting member.

In the above-mentioned embodiments, the stroke limit of the moving body 13 to one end side is defined by the contact of one end of the moving body 13 with the blocking member 3, and the stroke limit of the moving body 13 to the other end side is defined by the contact of the projection 15a of the piston 15 with the snap ring 21. However, this invention is not limited to the structure but it is possible to accomplish these definitions at desired positions by various means.

According to this invention as described above, the one spring seat is pressed on the one stopper and at the same time the other spring seat is pressed on the other stopper by the spring, and the one spring seat is made mate with the one stopping portion and at the same time the other spring seat is made mate with the other stopping portion, so that the moving body is located at the neutral position. Therefore, even the actuator having a structure as simple as the conventional 2-position actuator can locate the moving body precisely at the neutral position, and can accomplish the reduction in manufacturing cost and the decrease in size and weight simultaneously.

Further, when the moving body is composed of the moving body proper and the adjusting member screwing into one end of the moving body proper, the moving distance of the moving body to one end side can be adjusted voluntarily.

INDUSTRIAL APPLICABILITY

As described above, the 3-position actuator of this invention can be utilized effectively for changing to three modes in speed change of vehicles such as bus etc.

What is claimed is:

1. A 3-position actuator having a moving body comprising a piston slidingly reciprocating for a specified distance in an axial direction within a casing having an inner surface of substantially constant diameter, and a piston rod which moves integrally with the piston and a part of which protrudes out of said casing, said moving body being moved to one end side when fluid flows into a first fluid chamber through a first port formed on said casing, and said moving body being moved to the other end side when fluid flows into a second fluid chamber through a second port formed on said casing; characterized by that a pair of stoppers are installed in said casing with a specified clearance left between them in the axial direction, one stopper of said pair of stoppers comprising a snap ring disposed on an axially central portion of said inner surface of substantially constant diameter of said casing, a pair of spring seats and a spring are installed between the pair of stoppers, said spring is located between the pair of spring seats to press one-side spring seat against said one-side stopper and to press the other-side spring seat against said other-side stopper, a pair of stopping portions are provided on said moving body in a projecting manner with a specified clearance left between them in the axial direction, said one-side stopping portion mates with said one-side spring seat from a side opposite to the spring under a state where said one-side spring seat contacts with said one-side stopper, and said other-side stopping portion mates with said other-side spring seat from the side opposite to the spring under a state where said other-side spring seat contacts with said other-side, wherein said piston rod comprises male threads formed on an outer periphery at one end of said piston rod for screwing into said piston, and wherein the moving distance of the moving body to one end side is made adjustable by rotating said piston rod within said piston.

2. A three-position actuator as set forth in claim 1, wherein said moving body which comprises said piston and piston rod further comprises an internal fastening screw axially extending from said piston and centrally screwed within said piston rod.

3. A three-position actuator as set forth in claim 2, wherein said moving distance of said moving body to one end side is made adjustable by said rotating of said piston rod within said piston and adjusting said axially extending screw via a hole in an end of said casing.

* * * * *

UNITED STATES PATENT AND TRADEMARK OFFICE
CERTIFICATE OF CORRECTION

PATENT NO.:   5,189,942
DATED      :   March 2, 1993
INVENTOR(S):  Masahiro OHKUBO It is certified that error appears in the above-identified patent and that said Letters Patent is hereby corrected as shown below:

On the cover page, Item [87], line 1 "WO91/09069" should read --WO91/10069--.

On the cover page, Item [87], line 2 "Jun. 27, 1991" should read --July 11, 1991--.

Signed and Sealed this

Twelfth Day of September, 1995

BRUCE LEHMAN

*Attest:*

*Attesting Officer*            *Commissioner of Patents and Trademarks*